July 20, 1948.
W. D. MACGEORGE
2,445,683
APPARATUS FOR EFFECTING A PREDETERMINED
RATE OF SPECIMEN STRAIN
Filed Nov. 2, 1944
2 Sheets-Sheet 1
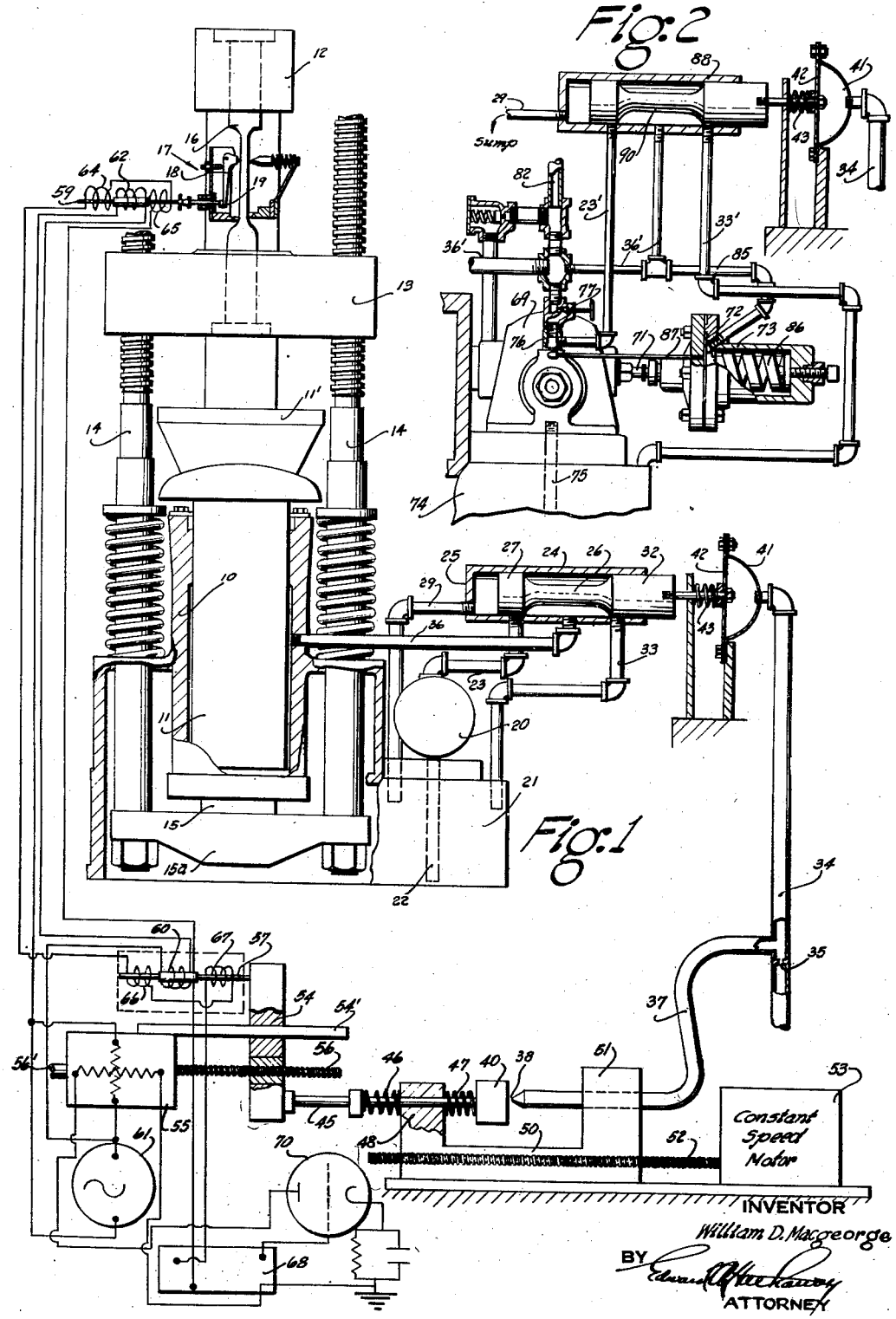
INVENTOR
William D. Macgeorge
BY
ATTORNEY July 20, 1948.                W. D. MACGEORGE                    2,445,683
                  APPARATUS FOR EFFECTING A PREDETERMINED
                            RATE OF SPECIMEN STRAIN
Filed Nov. 2, 1944                                          2 Sheets-Sheet 2

INVENTOR
William D. Macgeorge
BY
ATTORNEY

Patented July 20, 1948

2,445,683

UNITED STATES PATENT OFFICE 2,445,683

APPARATUS FOR EFFECTING A PREDETERMINED RATE OF SPECIMEN STRAIN

William D. Macgeorge, Drexel Hill, Pa., assignor to The Baldwin Locomotive Works, a corporation of Pennsylvania Application November 2, 1944, Serial No. 561,587

11 Claims. (Cl. 73—90)

This invention relates generally to materials testing apparatus and more particularly to apparatus for variably controlling the loading of a specimen so that it has a predetermined, preferably constant, rate of strain.

Various methods have heretofore been proposed and used to control the loading operation of a testing machine whereby the loading head is moved at a uniform rate of speed in an attempt to produce a constant rate of strain in the specimen but these prior arrangements have only approximated the desired results. In certain types of controls for hydraulic machines the rate of flow of the operating fluid to the hydraulic cylinder was taken as an index of the rate of strain in the specimen and devices were provided to automatically maintain such flow at a uniform rate. While this control was reasonably adequate for many testing purposes, in many other cases it was found to be inadequate. This was because slippage of the grips on the work, elongation of the machine parts under stress, leakage in the cylinder, etc., all effect an actual difference between the rate of ram movement and the rate of strain finally induced in the specimen. But it is important that there be a constant rate of strain in the specimen. To actually accomplish this, visual indicating means have been employed in conjunction with manual control of the testing machine but this has definite disadvantages.

It is among the objects of this invention to provide improved means for controlling the loading of a specimen in a materials testing machine to maintain a predetermined rate of specimen strain automatically as a function of the actual rate of strain in the specimen. A further object is to provide improved means by which the loading of a specimen can be controlled in accordance with its strain in a relatively simple and economical manner and to do so with a high degree of accuracy, sensitivity and stability.

In the specific embodiments of the invention disclosed herein I provide essentially a mechanism that is responsive to strain in the specimen and then I compare the rate at which the specimen strain increases or decreases, as the case may be, with a predetermined standard whereby any difference between the two is utilized to control the operating fluid in the loading cylinder of the hydraulic testing machine so that the machine produces the desired rate of strain in the specimen. Inasmuch as this over-all mode of operation requires a high degree of precision, I have preferably provided in the specific aspect of my invention what might be termed a floating type of air jet control responsive to the differential action, this air jet control being the means for specifically controlling the operating fluid in the loading cylinder. While I have described my invention for purposes of illustration in connection with a hydraulic materials testing machine, it will of course be understood that the invention, broadly relates to testing machines whose power is subject to smooth and continuous adjustment during the course of a test.

Other objects and advantages will be more apparent to those skilled in the art from the following description of the accompanying drawings in which:

Fig. 1 represents a diagrammatic disclosure of a testing machine and control therefor with an illustrative electronic control for applying strain to the test specimen at a constant rate;

Fig. 2 is a fragmentary disclosure of a portion of the fluid pressure loading mechanism for a testing machine according to prior practices, modified by the control of the present invention;

Figure 3:
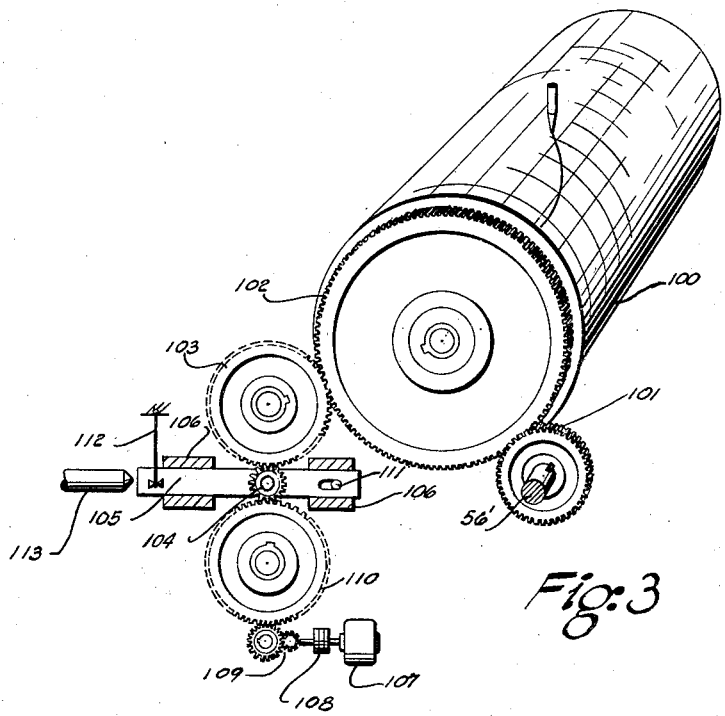
Fig. 3 is a further modification of a mechanism for comparing the rate of strain in the specimen against a predetermined standard.

In the illustrative embodiment of the invention, I have shown one general type of testing machine, among possible others, adapted to vary the rate of loading during a test, which for purposes of illustration is shown herein of the hydraulic type, specifically that of Emery Patent No. 1,848,468, consisting of a hydraulic cylinder 10, a load producing ram 11 connected to a loading frame 12, and a sensitive weighing frame having an adjustable crosshead 13 connected by rods 14 to a hydraulic weighing capsule 15 interposed between a lower crosshead 15a and the bottom of the main cylinder 10. My invention is applicable to either tension or compression tests. For compression tests the test piece is disposed between the crosshead 13 and a table 11' formed on the loading ram and for tension between the head 12 and the crosshead 13.

To control the loading fluid as a direct function of developed strain in a specimen, such as a tension specimen 16, I utilize any suitable extensometer 17, one well-known form of which generally employs a pivoted bell crank lever 18, one arm of which constitutes a gauge point contacting the specimen and the other arm having a free end 19 moving transversely of the test piece in response to elongations of the test piece.

While it is contemplated that the motor driven fluid pressure pump may be of the type disclosed in Dinzl Patent No. 2,134,707, yet any source of adequate fluid pressure may be used. Preferably this pressure is maintained at a maximum at all times in excess of the actual needs. A constant pressure pump 20 will therefore suffice. It draws fluid from an oil sump 21 through an intake 22 and discharges through a conduit 23 to a plunger valve housing 24 preferably toward a closed end 25 which is drained back to the sump by a pipe 29 to permit movement of the valve plunger 26 in the housing and to take care of leakage. The valve plunger 26 is of the two-spool type, whereby with the plunger in the centered position shown, the spools 27 and 32 are just closing off both the delivery tube 23 from the pump and the exhaust or drainage tube or conduit 33 leading to the oil sump 21. With the plunger position as shown, it will be clear that the pressure existing in the main cylinder 10 will be substantially maintained, although as will become more evident, this is such a transitory condition in the operation of the device that whether the pressure is held without any shifting of the valve is inconsequential as it is so rapidly followed by an incremental increase of pressure as to represent in effect a steady and progressive increase of load-producing pressure.

To control the valve 26 in accordance with strain I provide the following mechanism. A compressed air line 34 leads through a constriction 35 and is connected through a flexible connector or hose 37 to an air jet or nozzle 38 initially in a predeterminedly spaced relation to a flap valve 40. The supply line 34 is also connected to a diaphragm type servo-motor 41 whose diaphragm 42 is connected to a valve plunger 26 and is spring loaded to move the plunger outwardly as the air pressure in the line 36 drops. The flap valve 40 is mounted on a slidable shaft 45 having preferably a pair of compression springs 46 and 47 to center the shaft in the wall 48 of a traveling nut 50 which also fixedly carries the nozzle 38 in a wall 51. The entire traveling nut assembly including shaft 45, springs 46 and 47, and the flap valve 40, the wall 48, wall 51, and nozzle 38 is movable as a unit in accordance with the rotation of a threaded shaft 52 driven by a constant speed motor 53. The latter preferably has different speed adjustments so that nut 50 may travel at any desired speed, but when a given speed has been selected, it is maintained. If desired, for purposes of reverse control actuation as well as for re-setting the system, the motor 53 may be driven in either direction.

A traveling abutment 54 guided on a rod 54' and adapted to engage rod 45, is driven by a selectively energized variable speed motor 55, capable of running in either direction in accordance with the relative lag or lead of the phase of selectively impressed voltage in comparison with that of a constantly impressed voltage. The motor 55 rotates a threaded shaft 56 to move abutment 54. It may also drive any usual and well-known recorder drum whose shaft is shown diagrammatically at 56'. The traveling nut 54 is adapted to engage the end of shaft 45 to push it toward nozzle 38 against the resilience of compression spring 46 to establish a neutral setting of flap valve 40. The abutment 54 is also adapted to have abutting engagement with the end of a core element 57 of a follow-up electro-magnetic motion responsive device which per se constitutes the subject matter of my copending application Ser. No. 532,673 filed April 25, 1944, now patent 2,427,866, granted September 23, 1947. A primary coil 60 of this device is in series with a source of alternating voltage 61 and with a primary coil 62 of a second and similar motion responsive device formed as a part of an extensometer 17 which is also disclosed in my said copending application. This second device has its core 59 axially movable in the coil 62 proportional to the strain in the test piece 16 through the action of the bell-crank 18 in engagement with the specimen 16. The constant alternating voltage 61 is also applied to one winding of a motor 55 which is normally stationary when no voltage is impressed on the motor, thus indicating that the system is at a null point. The actuating voltage for the motor 55 is supplied by a circuit comprising oppositely wound secondary coils 64 and 65 of the extensometer responsive device 17 coupled in series and in series with the correspondingly oppositely wound secondary coils 66 and 67 of the follow-up responsive device. These secondary coils are also connected to a voltage amplifier 68, and the latter leads to a power amplifier 70, the output of which connects with the other winding of the motor 55.

Whenever the cores 59 and 57 are in the same relative positions in their respective coils, the output from the power amplifier 70 is null and the motor 55 is stationary. Also, whenever one core is in one relative position in its coils while the other occupies a disproportionate or different relative position in its coils, there will be developed an alternating voltage of such phase relative to the constantly applied voltage 61 as to drive the motor 55 in one direction or another at a speed which is a function of the differential core positions.

*Operation.*—With all elements positioned substantially as shown, the constant speed motor 53 is operated at any selected constant speed proportional to the speed at which it is desired to have the strain applied to the test piece. The motor 53 drives threaded shaft 52 to move the carriage 50 toward abutment 54. As the latter is stationary at this time owing to a balanced condition in the electronic circuit, and as the shaft 45 is in contact with abutment 54, the running of the motor immediately moves the valve baffle 40 closer to the nozzle 38 thus reducing or cutting off its opening for the egress of air from the air system, and restricts the air flow with a consequent increase of pressure in the pipe 34 and behind the diaphragm 42, which forces the valve plunger 26 inwardly of the valve housing. This inward movement of the valve plunger opens pipe 23 to supply pump fluid through pipe 36 to the main cylinder 10 which produces loading movement of ram 11 and consequent strain in the test piece. The extensometer 17 effects a minute transverse motion of core 59 of the electro-magnetic device which instantaneously unbalances the electronic system and causes the motor 55 to run at a speed which is a function of the degree of unbalance of the electrical system, and in a direction to cause abutment 54 on threaded shaft 56 to move to the left. During this time the carriage 50 and shaft 45 is being moved to the left at a desired constant speed by motor 53. If the rate of strain is faster than the selected standard speed of motor 53 the baffle 40 will increase the nozzle opening with a consequent decrease of pressure to its initial value. This reduction in pressure allows spring 43 to return valve plunger 26 to neutral, thereby shutting off the pump supply.

Simultaneously with the foregoing operation, the abutment 54 will have moved the core piece 57 of the follow-up electro-magnetic device to a position corresponding to that of core 59 to establish a balanced or null condition in the electronic system and thereby stopping motor 55. However, as constant speed motor 53 will have continued to run, it will cause the shaft 45 to progress toward abutment 54, which by then will again be stationary. As the shaft 45 engages the abutment 54 the jet baffle 40 will be again moved toward the nozzle 38, with a repetition of the decrease in bleeding rate and consequent increase in air pressure in the air system. This will again move plunger 26 to admit oil under pump pressure to the ram cylinder to produce further loading movement of the ram 11. The above operations will occur as one continuous and smooth cycle with the valve 26 in such a partially opened position as to maintain the whole system in a state of delicate balance accommodated to a uniform rate of strain in the specimen and adapted instantly to vary the supply of pump fluid to obtain a controlled steady rate of strain on the test piece.

The control system disclosed can be reversely operated upon a decrease of strain by reversing the rotation of motors 55 and 53. In this case the nozzle 38 will move to the right away from baffle 40 thereby decreasing the diaphragm pressure so that spring 43 will move valve 26 to the right. The valve 26 will thereby reduce the loading pressure by discharging through pipe 33, if discharging is necessary. Such reversal will enable the reading of the hysteresis of the test piece.

The disclosure of Fig. 1 is preferred although there are many installations already in use employing the variable displacement pump control of Dinzl Patent 2,134,707. My control system of Fig. 1 may be applied to the Dinzl control as shown in the fragmentary disclosure of Fig. 2, all other parts of the testing machine and control thereof being the same as disclosed in Fig. 1.

Fig. 2 includes a variable positive displacement pump 69 of the well-known Hele Shaw type driven by an electric motor at a constant rate. The rate of pump discharge is controlled by a shaft 71 movable axially as a function of the differential pressures on a diaphragm 72 in a housing 73. The pump 69 draws fluid from an oil sump 74 through a pipe 75 and discharges through a conduit 76 and differential pressure control valve 77 to cylinder 10 of the testing machine (Fig. 1). Fluid from the main cylinder may be exhausted through a normally valve closed pipe 82 back to the sump as shown in said Dinzl patent.

Fluid from the low pressure side of valve 77 is supplied through a pipe 85 to one side of the diaphragm 72, this pressure being identical with that in cylinder 10. The pressure on this side of the diaphragm is augmented by a spring 86. Such fluid pressure and the spring force are balanced by the pressure from the high side of the valve 77 transmitted through a pipe 87. As the load on the specimen increases or decreases, as the case may be, and the pump speed or pump leakage inherently varies with the load, it is necessary to compensate for this by adjusting the piston displacement of the pump. In this manner it is possible to maintain a predetermined constant pressure differential on opposite sides of valve 77 and accordingly produce a uniform rate of flow to the main cylinder 10. Due to leakage in the main cylinder varying with the loading pressure as well as slippage of the grips and elongation of the testing machine frame, a constant pressure differential on opposite sides of the diaphragm is not necessarily a true index of the rate of application of strain to the specimen 16. To accomplish this desired result the additional control of my invention is introduced by which the former more or less approximate result can be made accurate and more critically responsive to a desired rate of strain in the test piece. To this end a valve housing 88 is provided, having a slidable valve plunger 90, controlled by a spring-loaded diaphragm 42 of Fig. 1. The valve 88 and diaphragm control operate identically as in Fig. 1 in conjunction, of course, with the electrical and air jet control system of Fig. 1.

The pipes 23' and 36', corresponding respectively to pipes 23 and 36 of Fig. 1, are connected to the high pressure side of the pump and to the main cylinder. A drain pipe 33' corresponds to pipe 33 of Fig. 1.

In Fig. 2 the actual control of the rate of strain will be a function of the activity of both the combined electronic and air relay of Fig. 1 but also of the maintenance of the pre-determined differential pressures on the diaphragm 72. In some cases it may be desired to increase the pressure on the spring 86 to the utmost so as to maintain as large an output of fluid under pressure as possible from the pump, and to control mainly from the combined electronic and air system of Fig. 1 as diagrammatically represented by the fragment of air pipe 34 and the diaphragm housing 41.

It will be understood that my air jet and bleeding valve control may be used with any suitable means that is responsive to strain. For instance, the strain recorder system shown in Templin Patent 2,091,534 has a rotatable strain recorder whose rotary motion may actuate screw 56 of my present invention.

In the modification of Fig. 3 a recording drum 100 may be driven through gearing 101 from a strain controlled motor such as 55 of Fig. 1 whose shaft 56' is partially shown in Fig. 3. When the motor 55 is used in the modification of Fig. 3 the elements 45, 50, 54 and 56 of Fig. 1 are not employed. Also, if desired, the drum may be actuated in accordance with specimen strain in the manner disclosed in Templin Patent No. 2,091,534. In either case, however, the rotation of the drum and its gear 102 is in proportion to specimen strain so that I utilize this gear to drive an intermediate idle gear 103 meshing with a floating pinion 104 which is rotatably mounted on a slidable bar 105 constituting a jet baffle. The axis of the pinion shaft is fixed with respect to the slide bar 105 but is longitudinally movable therewith, the bar being suitably supported in guide bearings diagrammatically indicated at 106. To provide a standard rate of speed against which the actual rate of specimen strain is to be compared or controlled, I provide a preferably constant speed motor 107 corresponding to motor 53 of Fig. 1 and adjustable for different speeds. This motor drives through a suitable and well-known slip clutch 108 and gears 109 to drive a gear 110 meshing with floating pinion 104. The gears 103 and 110 rotate in opposite directions and are of preferably identical size in order that pinion 104 may have uniform engagement with the two gears during shifting of the pinion. The slide bar 105 is limited in its longitudinal movement by a pin and slot 114 while a spring 112 suitably engages the slide bar to constantly bias it in one direction to take up slack in the gear teeth. An air nozzle 113 corresponding to nozzle 38 of Fig. 1 is controlled by the end of bar 105 acting as an air jet baffle to vary pressure within the nozzle pipe line such as 36 and 37 of Fig. 1 is controlled by the end of bar 105 acting as an air jet baffle to vary pressure within the nozzle pipe line such as 36 and 37 of Fig. 1. The remaining control valve mechanism 24, pump 20, diaphragm motor 41 and the other hydraulic connections to the testing machine are the same as shown in Fig. 1 and hence need not be further described.

In the operation of Fig. 3, the drum 100 rotates in proportion to the actual specimen strain thereby causing rotation of gear 103 in one direction while the gear 110 rotates in the opposite direction at a predetermined, preferably constant, rate of speed. So long as the specimen strain changes at the predetermined speed, gears 103 and 110 will rotate at equal speeds in opposite directions and thus allow pinion 114 to rotate idly about a stationary point. However, if the rate of strain varies from the desired rate, either up or down, then a differential movement occurs between gears 103 and 110 with the result that pinion 104 is shifted to the right or left as the case may be and moves baffle bar 105 accordingly. If the baffle is moved so as to decrease the discharge of fluid from nozzle 113 pressure will build up in the diaphragm motor 41, Fig. 1, to operate the hydraulic system as previously described for that figure, and similarly if the bar 105 moves away from the nozzle 113 the pressure in diaphragm motor 41 will decrease so as to actuate valve 24 in the opposite direction. In this manner the rate of applying load to the specimen is either increased or decreased in accordance with variations in the rate of specimen strain from a predetermined value. If the specimen is being strained at the desired rate, and assuming the whole system and testing machine operation to be operating in a balanced state, then the baffle will remain in one position in front of nozzle 113 in the same manner that nozzle and baffle 38 and 40 of Fig. 1 will similarly operate. If the baffle bar is shifted to a point whereby it cannot further move, then the clutch 108 will slip so as to allow constant speed motor 107 to continue its rotation and thus be ready instantaneously to move the baffle bar in response to changes in the specimen strain.

Figure 4:
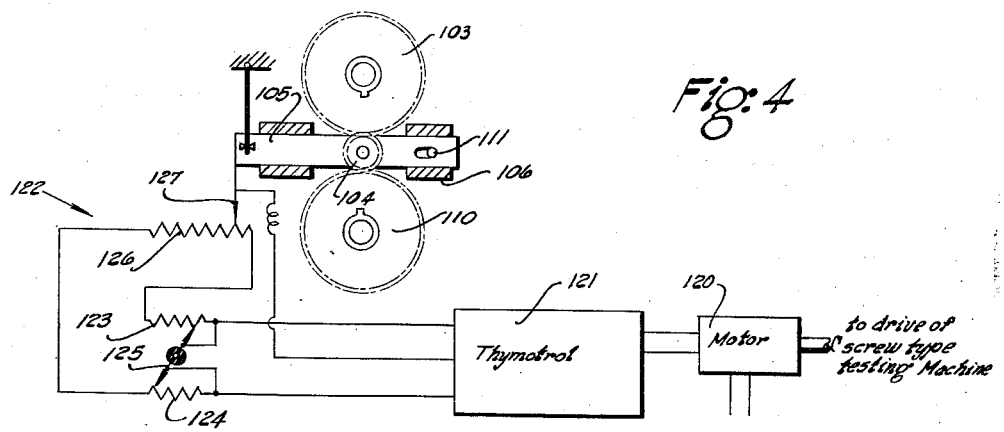
Fig. 4 is a modification showing the application of my invention to a variable speed electric motor of a screw type testing machine.

*Fig. 4 modification.*—In this modification the testing machine may be assumed as previously mentioned in connection with the other arrangements of my invention to be a motor driven screw type machine well-known in the art. A variable speed motor 120 for driving the testing machine screws is controlled by a Thermotrol 121 or equivalent electronic control of other manufacture for varying the speed of motor 120 in accordance with an input which is varied by a potentiometer generally indicated at 122 and in accordance with variations in specimen strain from a desired predetermined value. To set the potentiometer at the desired rate of strain a pair of resistances 123 and 124 are simultaneously adjustable by a pair of commonly angularly adjustable switch arms diagrammatically indicated at 125. Another resistance 126 is varied by a slider contact 127 connected to the end of slider bar 105. This bar in the other modifications functions as a baffle for the air jet and as shown in such modifications is actuated by the actual strain in the specimen compared to a standard speed. Accordingly, the same reference numbers are used on similar elements, and it will also be understood that Fig. 4 includes a recorder drum, standard speed motor, etc., for driving differential gears in the same manner as shown in the Fig. 3 modification.

From the foregoing disclosure it is seen that I have provided an automatic rate of strain control that has a high degree of simplicity, accuracy and sensitivity and one that may be readily adjusted to different rates of strain and be applied to old as well as new testing machines having variable rates of loading.

It will of course be understood that various changes in details of construction and arrangement of parts may be made by those skilled in the art without departing from the spirit of the invention as set forth in the appended claims.

I claim:

1. Materials testing apparatus comprising, in combination, a power operated mechanism for loading a specimen to produce strain therein, means for varying the power of said mechanism and thereby vary the rate of strain of the specimen, means responsive to the rate of strain of the specimen, means for establishing a predetermined speed at which it is desired to strain the specimen, and air jet and baffle means controlled by said strain responsive means and by said speed means for adjusting said power varying means in a direction to maintain a substantially predetermined rate of specimen strain automatically upon occurrence of variations in specimen strain from the predetermined rate.

2. Hydraulic materials testing apparatus for loading a specimen comprising, in combination, power operated mechanism for loading a specimen to produce strain therein including a hydraulic ram, a source of hydraulic fluid under pressure, a valve unit for varying the power of said mechanism by controlling the rate of flow between the source of fluid and hydraulic ram and thereby vary the rate of strain of the specimen, and means for adjusting the valve unit automatically in accordance with variations in strain of the specimen from a predetermined rate, said means including air jet and baffle elements, a motor operating at a constant speed which is proportional to the desired rate of application of strain to the specimen and adapted to effect a relative movement between said elements and means driven in proportion to the rate of strain of the specimen and adapted to effect a further relative movement between said elements whereby any differential action between the same causes the valve unit to be adjusted to restore the predetermined rate of strain to the specimen.

3. A hydraulic materials testing machine for loading a specimen comprising a hydraulic ram, a source of hydraulic fluid under pressure for operating said ram, an air jet and baffle control means, a valve operably associated with said air means to control operating fluid for the ram from the source, means responsive to the rate of strain of the specimen, means connected to said air means to establish a predetermined rate of speed at which it is desired to strain the specimen, and a control system operatively associated with the means responsive to the rate of strain and also operative on said air means to actuate the same and thereby control the operating fluid supply to the ram automatically as a function of any variation between said predetermined rate and the actual rate of specimen strain.

4. The combination set forth in claim 3 further characterized in that the predetermined rate means has provisions for moving one of said air jet and baffle elements, at said predetermined speed, and said control system has means for moving the other of said elements at a speed which varies with the rate of strain of the specimen and servo-motor means controlled by the jet air pressure for changing the position of the hydraulic valve as a function of the change in relative position of the air jet and baffle elements thereby to control the rate of application of strain to the specimen in accordance with said predetermined speed.

5. In hydraulic materials testing machines, a hydraulic ram for imparting load to a test piece, a hydraulic valve having two ports and a plunger arranged, in one position, to close off one of the ports, a source of fluid under pressure in communication with the said port which is selectively cut off by the plunger of the valve, a conduit between the other of said ports and the hydraulic ram of the testing machine, and means operatively associated with such test piece and effective to establish communication between the two ports in the valve whenever the speed of application of strain to the test piece departs from a predetermined rate.

6. In hydraulic testing machines, a source of hydraulic fluid pressure, a hydraulic ram, a connection between the source and the ram, an adjustable hydraulic valve in the connection and arranged in one position to establish and in another position to disestablish communication between the source and the ram, an air system including an air-operated motor controlling the position of said hydraulic valve, a nozzle for the passage of air, a source of air pressure communicating with both the nozzle and the motor, a baffle for said nozzle, an electric motor arranged to be driven at a predetermined constant speed, means for moving one of the nozzle or baffle elements as a function of the speed of the electric motor, a second electric motor operatively coupled to move the other of said nozzle or baffle elements at varying speeds, and means operating as a function of the rate of application of strain to a test piece for controlling the said second motor and therefor the said air motor to change the rate of application of pressure to the said ram.

7. In hydraulic testing machines a control system therefor comprising an electric follow-up system including two electro-magnetic devices each having a relatively movable core, a first electric motor operated by the system, means for moving one of said cores in proportion to the application of strain to a test piece, to unbalance the system, means actuated by the said motor for moving the other core in a follow-up system, a second electric motor arranged to be driven at a predetermined constant speed, an air relay system comprising an air nozzle, means mounting the nozzle for movement by the second motor, an air motor actuated in accordance with changes in the discharge rate through the nozzle, a baffle valve movable relative to the nozzle to change said discharge rate, means positionable by the first mentioned motor and operable to change the position of the baffle valve to change the discharge rate from said nozzle from a predetermined rate during balance of the electric follow-up system, and to enable return of the baffle valve to a position relative to the nozzle such as to reestablish the predetermined discharging rate whenever the electrical follow-up is unbalanced.

8. In hydraulic testing machines a control system therefor comprising an electric follow-up system including two electro-magnetic devices each having a relatively movable core, a first electric motor operated by the system, means for moving one of said cores in proportion to the application of strain to a test piece, to unbalance the system, means actuated by the said motor for moving the other core in a follow-up system, a second electric motor arranged to be driven at a predetermined constant speed, an air relay system comprising an air bleed nozzle, means mounting the nozzle for movement by the second motor, an air motor actuated in accordance with changes in bleeding rate relative to the nozzle, a baffle valve movable relative to the nozzle to change the bleeding rate, means positionable by the first mentioned motor and operable to change the position of the baffle valve to change the bleeding rate from said nozzle from a predetermined rate during balance of the electric follow-up system, and to enable return of the baffle valve to a position relative to the nozzle such as to reestablish the predetermined bleeding rate whenever the electrical follow-up is unbalanced, and a hydraulic valve, positionable by the said air motor for controlling the rate of loading of the hydraulic testing machine and accordingly control the rate of strain in the test piece.

9. In hydraulic testing machines a control system therefor comprising an electric follow-up system including two electro-magnetic devices each having a relatively movable core, a first electric motor operated by the system, means for moving one of said cores in proportion to the application of strain to a test piece, to unbalance the system, means actuated by the said motor for moving the other core in a follow-up system rebalancing movement, a second electric motor arranged to be driven at a predetermined constant speed, an air relay system comprising an air bleed nozzle, means mounting the nozzle for movement by the second motor, an air motor actuated in accordance with changes in bleeding rate relative to the nozzle, a baffle valve movable relative to the nozzle to change the bleeding rate, means positionable by the first mentioned motor and operable to change the position of the baffle valve to change the bleeding rate from said nozzle from a predetermined rate during balance of the electric follow-up system, and to enable return of the baffle valve to a position relative to the nozzle such as to reestablish the predetermined bleeding rate whenever the electrical follow-up is unbalanced, a hydraulic testing machine, a source of fluid under pressure, a connection between the testing machine and the said course, a hydraulic valve in the connection and operative by the said air motor to establish communication through the connection during deviations of the bleeding rate from the predetermined rate.

10. In hydraulic testing machines a control system therefor comprising an electric follow-up system including two electro-magnetic devices each having a relatively movable core, a first electric motor operated by the system, means for moving one of said cores in proportion to the application of strain to a test piece, to unbalance the system, means actuated by the said motor for moving the other core in a follow-up system rebalancing movement, a second electric motor arranged to be driven at a predetermined constant speed, an air relay system comprising a bleed nozzle, means mounting the nozzle for movement by the second motor, an air motor actuated in accordance with changes in bleeding rate relative to the nozzle, a baffle valve movable relative to the nozzle to change the bleeding rate, means positionable by the first mentioned motor and operable to change the position of the baffle valve to change the bleeding rate from said nozzle from a predetermined rate during balance of the electric follow-up system, and to enable return of the baffle valve to a position relative to the nozzle such as to reestablish the predetermined bleeding rate whenever the electrical followup is unbalanced, a hydraulic testing machine, a source of fluid under pressure, a connection between the testing machine and the said course, a hydraulic valve in the connection and operative by the said air motor to establish communication through the connection during deviations of the bleeding rate from the predetermined rate, and a secondary control for the hydraulic testing machine operative to vary the rate of application of hydraulic pressure as a function of the differential hydraulic pressure between said source and said testing machine.

11. In hydraulic testing machines a control system comprising an electric follow-up system including two electro-magnetic devices each having a relatively movable core, a first electric motor operated by the system, means for moving one of said cores in proportion to the application of strain to a test piece, to unbalance the system, means actuated by the said motor for moving the other core in a follow-up system rebalancing movement, a second electric motor arranged to be driven at a predetermined constant speed, an air relay system comprising a bleed nozzle, means mounting the nozzle for movement by the second motor, an air motor actuated in accordance with changes in bleeding rate relative to the nozzle, a baffle valve movable relative to the nozzle to change the bleeding rate, means positionable by the first mentioned motor and operable to change the position of the baffle valve to change the bleeding rate from said nozzle from a predetermined rate during balance of the electric follow-up system, and to enable return of the baffle valve to a position relative to the nozzle such as to reestablish the predetermined bleeding rate whenever the electrical follow-up is unbalanced, a hydraulic testing machine, a source of fluid under pressure, a connection between the testing machine and the said course, a hydraulic valve in the connection and operative by the said air motor to establish communication through the connection during deviations of the bleeding rate from the predetermined rate, and a secondary control for the hydraulic testing machine functioning to vary the rate of application of hydraulic pressure as a function of the differential hydraulic pressure between said source and said testing machine, in which said source constitutes a variable delivery hydraulic pump.

WILLIAM D. MACGEORGE.

REFERENCES CITED

The following references are of record in the file of this patent:

UNITED STATES PATENTS

| Number | Name | Date |
|---|---|---|
| 2,081,599 | Peters | May 25, 1937 |
| 2,134,707 | Dinzl | Nov. 1, 1938 |
| 2,212,085 | Tate | Aug. 20, 1940 |
| 2,331,577 | Sonntag | Oct. 12, 1943 |
| 2,344,133 | Davis, Jr. | Mar. 14, 1944 |